(12) United States Patent
Abrams et al.

(10) Patent No.: US 6,945,198 B2
(45) Date of Patent: Sep. 20, 2005

(54) VARIABLE FUEL AND FLUID DELIVERY SYSTEM

(75) Inventors: Mitchell A Abrams, Corvallis, OR (US); Donald J. Coulman, Corvallis, OR (US); John M. da Cunha, Corvallis, OR (US); John M. Koegler, III, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/915,878

(22) Filed: Aug. 9, 2004

(65) Prior Publication Data

US 2005/0028787 A1 Feb. 10, 2005

Related U.S. Application Data

(63) Continuation-in-part of application No. 10/284,880, filed on Oct. 31, 2002, now Pat. No. 6,786,194.

(51) Int. Cl.$^7$ .............................................. F02B 47/00
(52) U.S. Cl. ..................................... 123/25 R; 123/304
(58) Field of Search ............................... 123/304, 25 R, 123/25 A, 25 C, 575, 577, 590, 300

(56) References Cited

U.S. PATENT DOCUMENTS

| | | | | |
|---|---|---|---|---|
| 4,481,921 A | * | 11/1984 | Tsukahara et al. | 123/304 |
| 4,499,861 A | * | 2/1985 | Wiegand et al. | 123/1 A |
| 4,499,862 A | * | 2/1985 | Baumer et al. | 123/1 A |
| 5,148,776 A | * | 9/1992 | Connor | 123/25 J |

* cited by examiner

*Primary Examiner*—Mahmoud Gimie

(57) ABSTRACT

A fuel injector includes a first input for receiving a fuel and a second input for receiving a non-fuel fluid. The fuel injector also includes a fluid ejector that includes a first drop ejector for discretely ejecting droplets of the fuel, the fluid ejector also including a second drop ejector for discretely ejecting droplets of the non-fuel fluid.

36 Claims, 6 Drawing Sheets

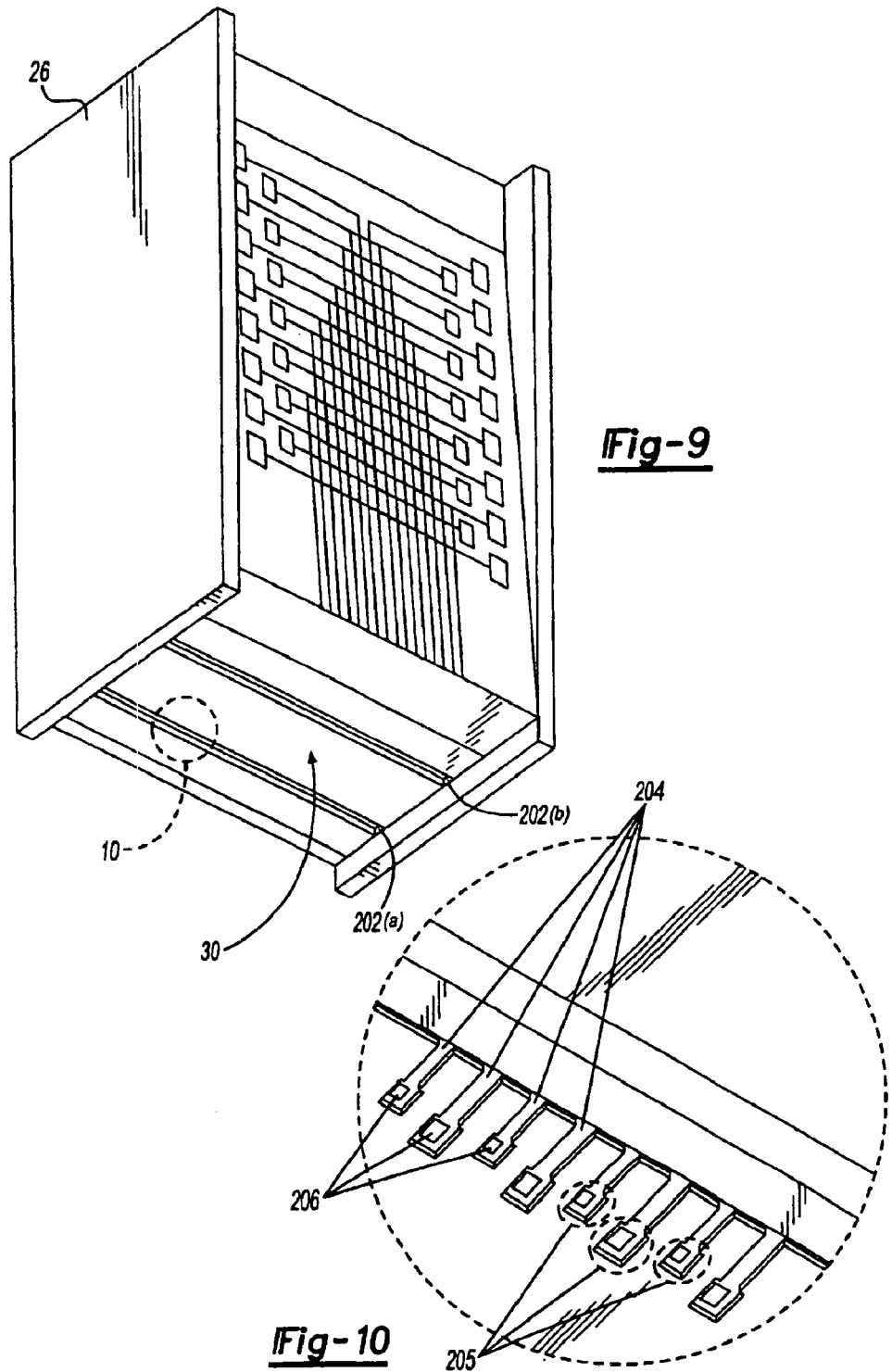

VARIABLE FUEL AND FLUID DELIVERY SYSTEM

RELATED INVENTIONS

The present invention is a continuation-in-part of U.S. application Ser. No. 10/284,880 filed on Oct. 31, 2002 now U.S. Pat. No. 6,786,194 entitled Variable Fuel Delivery System and Method, by John Koegler et al.

BACKGROUND OF THE INVENTION

Internal combustion engines generate power by causing a mixture of air and combustible fuel, such as gasoline, to ignite and burn in one or more combustion chambers, such as the combustion cylinders in an automobile engine. Conventionally, combustible fuel has been directed into the combustion chambers in vapor form using either a carburetor or a fuel injector. Common fuel injectors can be either continuous or pulsed. The continuous fuel injectors direct the combustible vapor into an intake manifold, and when an intake valve opens, the vapor is drawn into the combustion chamber by a piston. The pulsed fuel injectors direct fuel vapor on command into either a region upstream of each intake valve or directly into the combustion chambers. Both of these fuel delivery systems are highly developed, well known, and have been in use for decades.

On occasion, especially when an internal combustion engine is operated under a high load condition, the fuel vapor can ignite while the fuel vapor is still being compressed within the combustion chamber and prior to the firing of the spark plug. This preignition, which is characterized by a distinct knocking sound, can cause excessive engine wear as well as decrease the performance of the engine.

BRIEF DESCRIPTION OF THE DRAWINGS

FIG. 9 is a perspective view of a slide body of a fuel injector, according to an embodiment of the invention.

FIG. 10 is a close-up view of a portion of the slide body and drop ejector shown in FIG. 9.

DESCRIPTION OF THE EMBODIMENTS

An embodiment of an improved fuel injector for injecting combustible fuel and non-fuel fluids into a combustion chamber of an internal combustion engine is hereinafter described. The improved fuel injector delivers a combustible vapor, which is derived from fixed quantum fuel droplets, to a combustion chamber. In one aspect of the invention, the fuel injector is configured to deliver a fuel and non-fuel vapor (for example, water) mixture substantially simultaneously from a single fuel injector. The presence of the water vapor in the fuel mixture inhibits preignition of the fuel vapor in the combustion chamber. In other embodiments, the fuel injector injects other non-fuel fluids that are useful in reducing engine pollutants, cleaning various engine components, and so forth.

Figure 1:
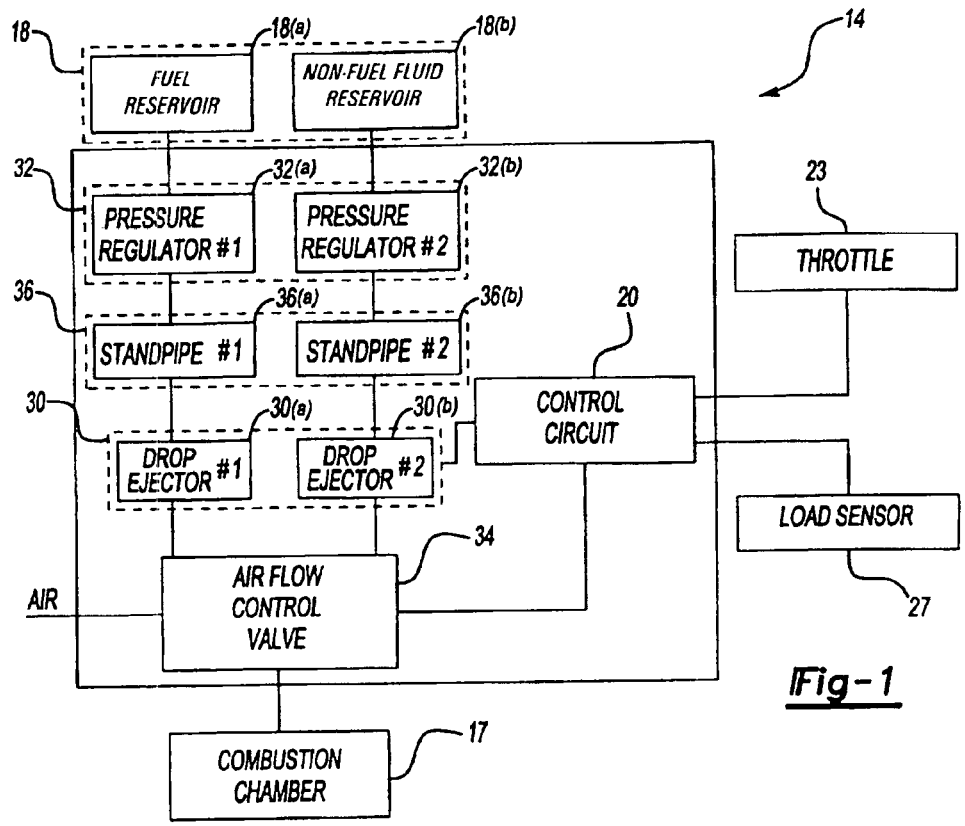
FIG. 1 is a block diagram a fuel delivery system according to an embodiment of the invention.

FIG. 1 is a high-level block diagram of one embodiment of a system employing an improved fuel injector according to the present invention. Reference numeral 14 generally indicates an apparatus for generating a combustible vapor for an internal combustion engine, herein referred to as a "fuel injector" for brevity. A fuel injector 14 includes a fluid ejector 30 and an airflow control valve 34. The fluid ejector 30 creates discrete droplets of fuel and non-fuel fluid droplets of fixed quantums. The fluid ejector 30 is fluidically connected, preferably under low pressure, to a fluid reservoir 18. Fluid reservoir 18 includes both fuel reservoir 18(a) and non-fuel fluid reservoir 18(b). The fuel and non-fuel fluid from the fluid reservoir 18 is preferably delivered to the fluid ejector 30 using a pressure regulator 32 and an operational standpipe 36 to prevent fuel and non-fuel fluid leakage from the fluid ejector 30 in non-use situations. In one embodiment, the fluid ejector 30 is removable and replaceable by the consumer.

A control circuit 20 controls the fluid ejector 30 and airflow control valve 34. The control circuit 20 is preferably connected to a throttle 23 and a load sensor 27. The throttle 23, such as an accelerator pedal in an automobile, is actuated by a user. The optional load sensor 27 monitors and senses the load of the combustible fuel device powered by the internal combustion engine when appropriate. When the optional load sensor 27 senses that the load has increased beyond predetermined threshold, non-fuel droplets (for example water droplets) are injected into the air stream.

The airflow control valve 34 regulates the flow of air that is mixed with the fuel and non-fuel droplets ejected from the fluid ejector 30 to create a combustible vapor, which is delivered into a combustion chamber 17, such as a typical combustion cylinder in an automobile. The combined fuel and non-fuel vapor that is delivered to the combustion chamber is ignited by an ignition device (not shown), such as a sparkplug, in a manner known in the art.

While FIG. 1 shows only a single combustion chamber 17 (for purposes of illustration), the present invention may be implemented with one or more combustion chambers 17, wherein additional combustion chambers 17 would correspond to additional fluid ejectors 30 and airflow control valves 34, all of which being controlled by control circuit 20. Further, depending on the number of fuels and non-fuel fluids used simultaneously in the system, the number of pressure regulators 32, standpipes 38, and fluid ejectors 30 would vary. For example, FIG. 1 illustrates an embodiment of the invention wherein two fuels (or other liquids) would be dispensed by the fuel injector 14. Accordingly, FIG. 1 illustrates the use of two pressure regulators 32(a), (b), two standpipes 38(a), (b) and two drop ejectors 30(a), (b), in addition to a fuel reservoir 18(a), and a non-fuel fluid reservoir 18(b).

A function of the fuel injector 14 is to produce very small, metered quantum, or "digital", droplets of combustible fuel mixed with a non-fuel fluid and to channel a controlled amount of air through the droplets, thereby generating a combustible vapor. The combustible vapor is drawn into the combustion chamber(s) 17 to power the engine while reducing preignition of the vapor in the combustion chamber(s).

Figure 2:
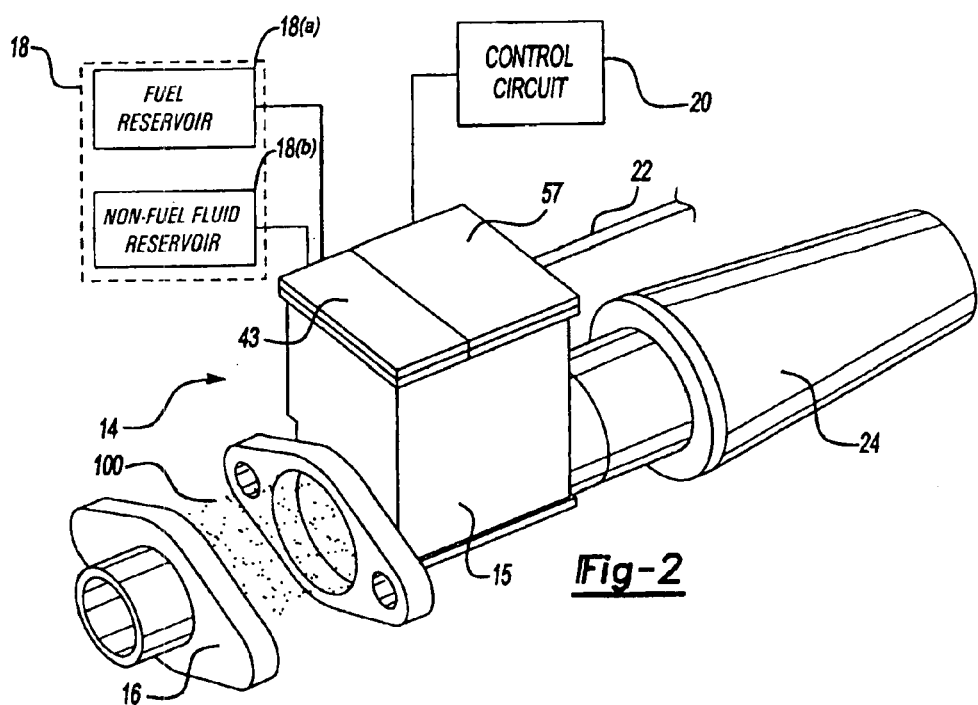
FIG. 2 is a top, side and perspective view, partially diagrammatic, of an apparatus for generating a combustible vapor for an internal combustion engine according to an embodiment of the invention.
Figure 3:
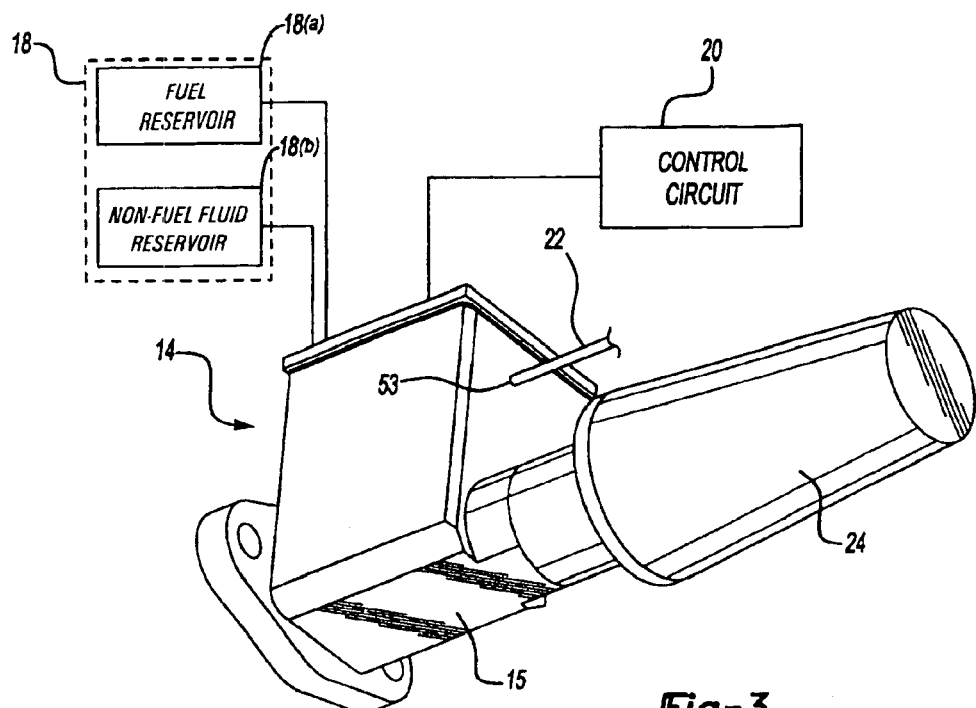
FIG. 3 is a bottom, side and perspective view, partially diagrammatic of the apparatus of FIG. 2.

Now, an embodiment of the fuel injector 14 of the present invention will be described in additional detail. FIGS. 2–10 illustrate various views and perspectives of the fuel injector 14 and its components. Referring first to FIGS. 2 and 3, the fuel injector 14 has a main body 15 that is mounted either on an intake manifold 16 of, or proximate to, the combustion chamber 17 (FIG. 1). The combined fuel and non-fuel vapor 100 produced by the fuel injector 14 passes through the intake manifold 16 into the combustion chamber 17. The main body 15 includes a first top member 43 and a second top member 57 (both of which are further described hereinafter). The fuel injector 14 is connected to control circuit 20, which generally controls the operation of the fuel injector 14 based upon input signals received from the throttle 23 (FIG. 1) and optional load sensor 27 (FIG. 1), as well as upon input signals received from a variety of other sensors and input devices. Throttle cable 22 is preferably connected to either a manual throttle or a foot pedal (not shown) and through a small hole 53 to the fuel injector 14. Physical actuation of the throttle cable 22 causes control signals to be provided to control circuit 20, which in turn controls the operation of the fluid ejector 30 and air control valve 34 (FIG. 1). For example, as described below, when the throttle cable 22 is pulled away from the main body 15, the control circuit 20 causes the fuel injector 14 to further open the airflow control valve channel and thereby channel additional air into the engine. Preferably, a conventional air filter 24 removes any particulate matter in the air stream entering the fuel injector 14.

The fuel injector 14 is connected to one or more fuel reservoirs 18(a), such as a fuel tank in an automobile, and one or more non-fuel fluid reservoirs 18(b). The embodiment shown in FIGS. 2 and 3 illustrates one fuel reservoir 18(a) and one non-fuel fluid reservoir 18(b), which allows the fuel injector to provide a combustible fuel vapor comprised from a mixture of a combustible fuel, such as gasoline, for example, and one non-fuel fluid, such as water, as described in more detail below. Where the invention is used to provide a combustible vapor comprised from more than one fuel, or more than one non-fuel fluid, a corresponding number of fuel reservoirs would be used. The fuel reservoir 18(a) and non-fuel fluid reservoir 18(b) may or may not be connected to fluid pumps. Some embodiments may make use of less-expensive gravity feed mechanisms to feed the fuel and the non-fuel fluid from fluid reservoir 18 to the fuel injector 14 because the fuel injector 14 requires only a minimal fuel pressure. The fuel can be any type of gasoline, Diesel fuels, alcohols, fuel oils, and kerosenes. In short, any combustible fuel or fuel combination that will power an internal combustion engine is acceptable in connection with the embodiment of FIG. 1.

Figure 4:
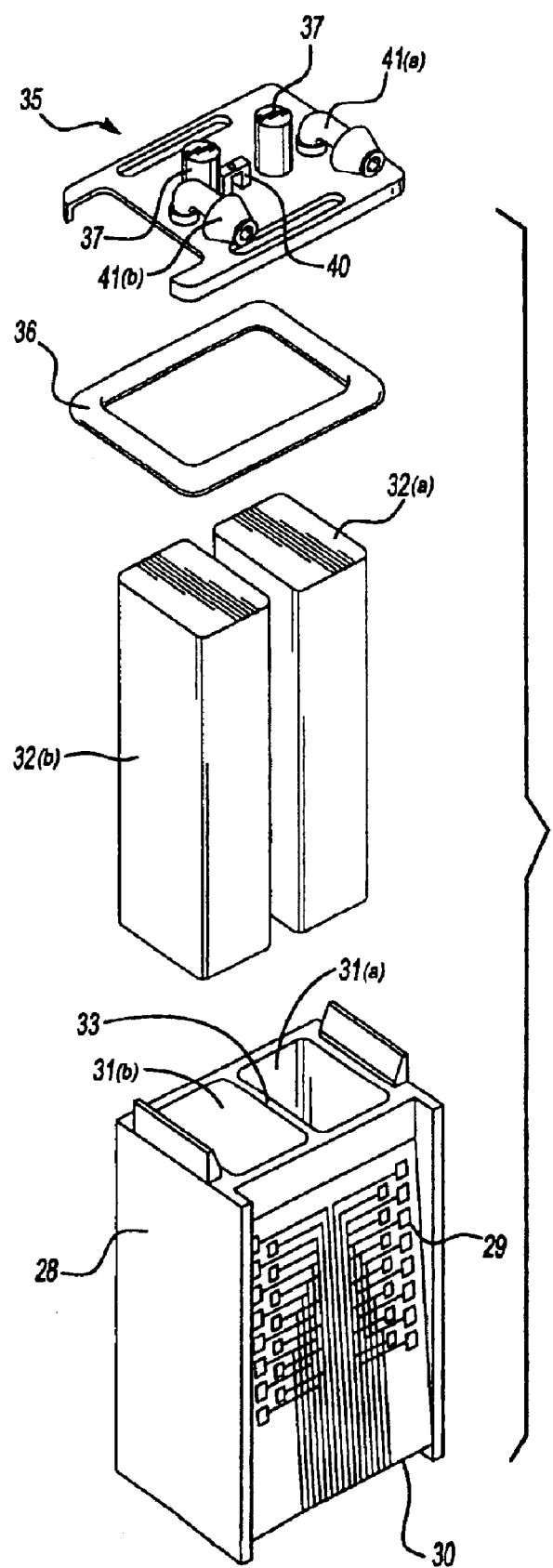
FIG. 4 is an exploded view of the micro-pump of the apparatus of FIG. 2.

With reference to FIG. 4, a slide body 26 contained inside of fuel injector 14 primarily performs the function of creating the combustible vapor 100 that is provided to the combustion chamber(s) 17. Slide body 26 is contained inside of fuel injector housing 15 (FIGS. 2 & 3). The slide body 26, which is replaceable by a consumer, functions both as a micro-pump, which expels small fuel droplets as well as droplets of non-fuel fluid, and an air control valve 34, which regulates the amount of air directed into the stream of fuel non-fuel fluid droplets and produced by the micro-pump to create the fuel vapor. The slide body 26 is similar to and operates in essentially the same manner as a thermal ink jet print cartridge known to those of skill in that art. In this exemplary embodiment, the slide body 26 includes a housing 28, upon which is mounted a TAB circuit 29. Other forms of interconnection are known to those skilled in the art and can be substituted for the TAB circuit 29 and still remain within the spirit and scope of the invention. The TAB circuit 29 is electrically connected to the control circuit 20 and a fluid ejector 30 located on the bottom wall of the housing 28. The TAB circuit 29 controls the fluid ejector 30 based upon control signals from the control circuit 20. An exemplary drop ejector is generally described in commonly-owned U.S. Pat. No. 6,162,589 entitled "Direct Imaging Polymer Fluid Jet Orifice" issued on Dec. 19, 2000 to Chen et al, though various exemplary features of a fluid ejector 30 are described hereinafter with respect to FIGS. 9 and 10.

Housing 28 further encompasses a pressure regulator 32, which is preferably comprised of reticulated foam (as illustrated in FIG. 4) but can also comprise many other forms of pressure regulators, such as a spring bag or a flexible diaphragm. In the embodiment shown in FIG. 4, the pressure regulator 32 actually comprises two separate pressure regulators 32(a) and 32(b), which enable the embodiment shown in FIG. 4 to receive and regulate the delivery of the fuel and the non-fuel fluid, which may have different surface tensions, viscosities, and so forth. In embodiments of the invention that deliver a fuel mixture comprised of more than one fuel or more than one non-fuel fluid, a corresponding number of pressure regulators would be employed. In the embodiment shown in FIG. 4, a middle wall 33 separates two cavities 31(a) and 31(b) in housing 28, which are configured to receive corresponding pressure regulators 32(a) and 32(b). Of course, in other embodiments of the invention, the number of cavities 31 may correspond to the number of fuels and non-fuel fluids that create the combustible vapor. The pressure regulators 32(a) and 32(b) are in fluid communication with the fluid ejector 30 through a slot or slots in the standpipe located in the bottom of the housing 28, which is described in more detail hereinafter with respect to FIGS. 9 and 10. The pressure regulators 32(a) and 32(b) place a slight negative pressure on the backside of the fluid ejector 30 so that the fuel and non-fuel fluid does not leak or dribble out of the fluid ejector 30.

In another embodiment, in which non-fuel fluid reservoir is filled with water or a mixture that is predominantly water, a pump may be located within the non-fuel fluid reservoir 18(b) for drawing the fluid mixture back into the reservoir when the associated engine is turned off. This feature may be especially useful in colder climates where the water or water mixture can freeze within the pressure regulator 32(b), the standpipe 36, the drop ejector 30(b), or in one more of the fluid couplers in between these.

Returning now to FIG. 4, the slide body 26 further includes a slide body top 35, which is designed to close the top opening of the housing 28. A gasket 36 seals the interface between the slide body top 35 and the housing 28 to prevent the fuel and non-fuel fluid inside of the slide body 26 from leaking out. The gasket 36 is preferably made from EPDM or polyurethane, though other materials could also be used and remain within the spirit and scope of the invention.

In FIG. 4, various physical elements are disposed on the outer side of the slide body top 35. Outer cylindrical members 37 are incorporated to retain compression springs 46 (FIG. 6), as described in more detail below. The loop member 40 functions to couple the throttle cable to the slide body 26. As a result, actuation of the throttle cable 22 causes the slide body 26 to move within the fuel injector main body 15 so as to adjust the amount of air entering the fuel injector 14, as described in more detail below. Finally, the fuel inlet conduit 41(a) and the non-fuel fluid conduit 41(b) are also disposed on the outer side of the slide body top 35. The fuel inlet conduit 41(a) and the non-fuel fluid conduit 41(b) are in fluid communication with the respective fuel reservoir 18(a) and the non-fuel fluid reservoir 18(b) (FIGS. 2 and 3), functioning to permit the flow of fuel and non-fuel fluid from the respective reservoirs into the slide body 26. The fuel inlet conduit 41(a) and the non-fuel fluid conduit 41(b) are preferably flexible and resiliently deformable so that the slide body 26 can move up and down within the fuel injector 14 without restriction from the fuel inlet conduit 41(a) and the non-fuel fluid conduit 41(b). FIG. 4 illustrates an embodiment of the invention having a fuel inlet conduit 41(a) and the non-fuel fluid conduit 41(b) so as to facilitate the production of a fuel and the non-fuel fluid vapor. In situations where the invention is used to deliver a combustible fuel vapor comprised from more than one fuel or more than one the non-fuel fluid, a corresponding number of fuel and non-fuel fluid conduits 41 would be employed.

Figure 5:
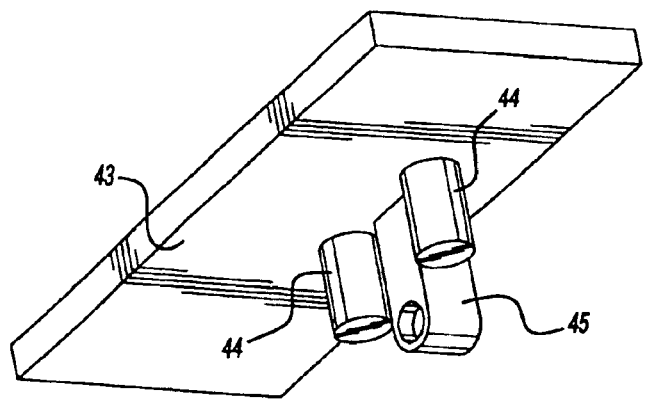
FIG. 5 is a perspective view of a component of the apparatus of FIG. 2.

FIG. 5 illustrates an inner (downside) wall of the first top member 43 of fuel injector main housing 15 (shown in FIGS. 2 and 3). The inner wall of first top member 43 preferably includes inner cylindrical members 44 and throttle cable guide 45. The inner cylindrical members 44 are preferably co-axial with the outer cylindrical members 36 on the outer side of the slide body top 35 (FIG. 4) when the fuel injector 14 (FIGS. 2 & 3) is fully assembled. Inner cylindrical members 44 and outer cylindrical members 37 function together to engage and retain the two compression springs 46 (described in more detail below) that provide a bias against the slide body 26 relative to the first top member 43 of the fuel injector main housing 15.

While the general operation of the fuel injector 14 of the present invention essentially functions, as described above, similarly to a thermal ink jet print cartridge, various properties of the desired fuel and non-fuel fluid used, such as surface tension, chemical reactivity, and volatility, to name a few, require that modifications be made to the design of conventional thermal ink jet print cartridges and thus prevents simply replacing ink with fuel and non-fuel fluids. Such changes include reducing the capillary sizes in the standpipe 36 between the backpressure regulator 32 and the fluid ejector 30 to account for a lower surface tension. Other changes include selection of materials for the body 15 and backpressure regulator 32 that are resistant to the fuel's solubility, such as Nylon 6. Further, the backpressure regulation should be adapted to account for the higher volatility of the fuel and perhaps even the non-fuel fluid.

Figure 6:
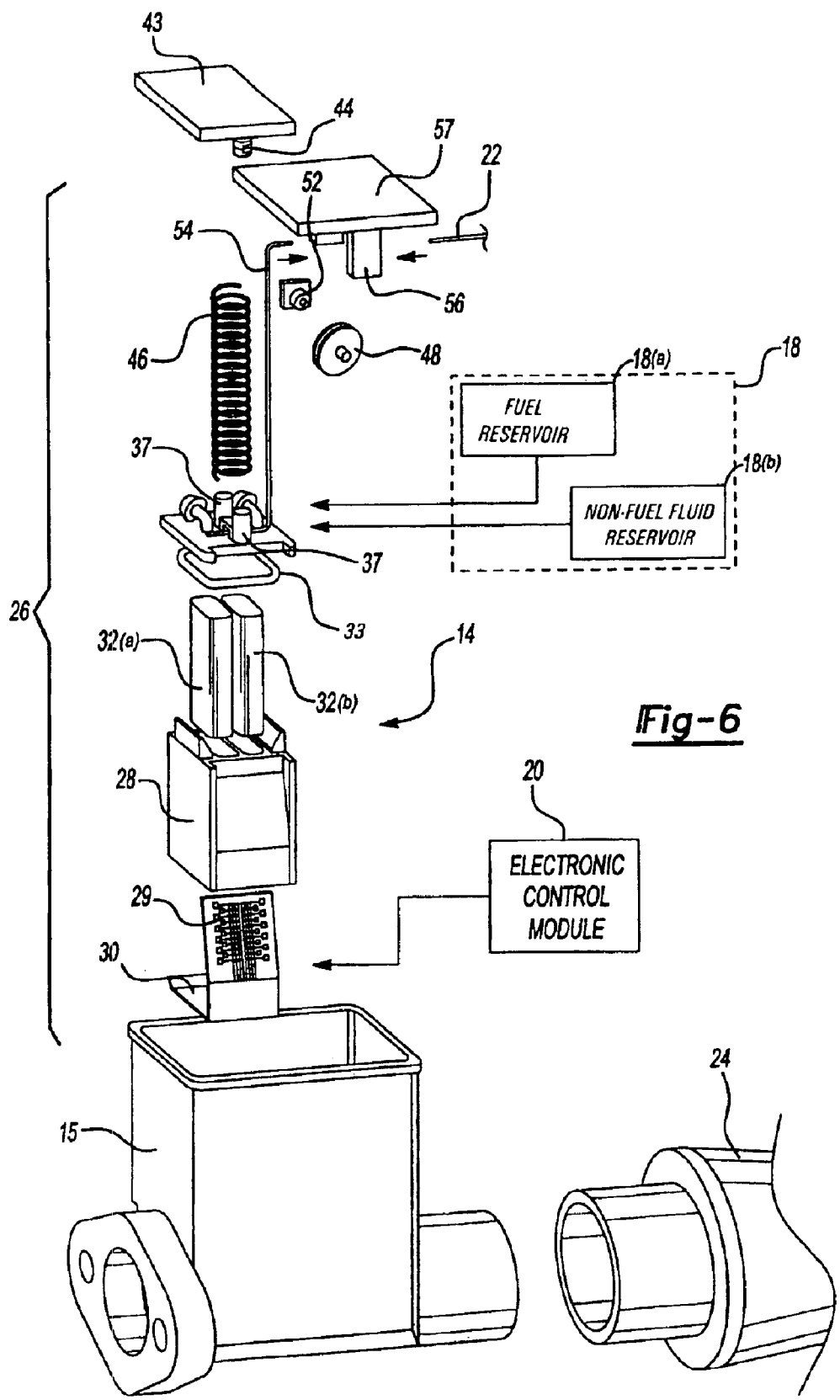
FIG. 6 is an exploded view, partially diagrammatic, of the apparatus of FIG. 2.
Figure 7:
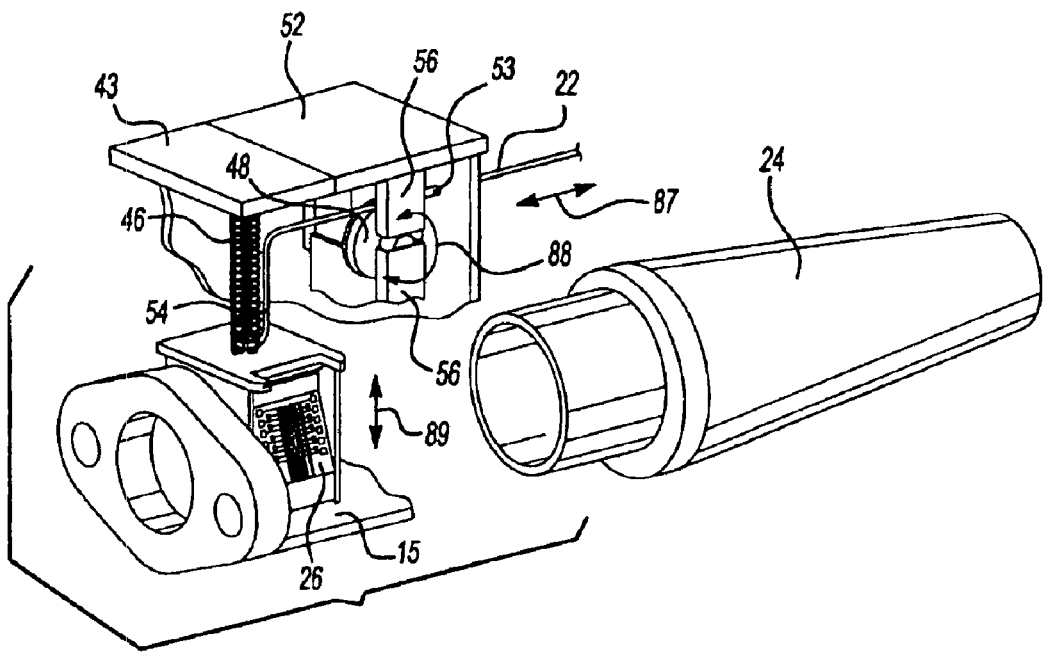
FIG. 7 is a perspective view, partially cut away, of the apparatus of FIG. 2.

FIGS. 6 and 7 both illustrate a full embodiment of the fuel injector 14 and its various components. FIG. 6 shows an exploded view of the fuel injector 14, while FIG. 7 shows an assembled cut-away view of the fuel injector 14. With reference to both FIG. 6 and FIG. 7 (where like elements have like reference numerals), the relationship of the various components of the fuel injector 14 will be described. As described above, air filter 24 is coupled to main housing 15, which provides a protected chamber to hold the various fuel injector components. The slide body 26—including fluid ejector 30, TAB circuit 29, slide body housing 28, pressure regulators 32(a) and 32(b), gasket 33, and slide body top 35—is slideably disposed inside of main housing 15. The control circuit 20 communicates with TAB circuit 29 to control fluid ejector 30. Fuel reservoir 18(a) and non-fuel fluid reservoir 18(b) are fluidly connected to fuel inlet conduit 41(a) and non-fuel fluid conduit 41(b) disposed on the outer side of the slide body top 35. When assembled, compression springs 46 (preferably manufactured from stainless steel) engage with outer cylindrical members 37 and inner cylindrical members 44 to urge the slide body 26 downward into the main body 15 and into a position that blocks the flow of air through the fuel injector 14.

Figure 8:
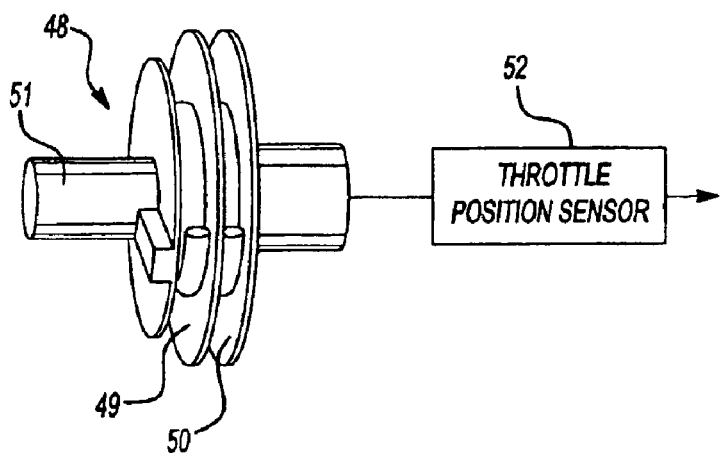
FIG. 8 is a perspective view of a component of the apparatus of FIG. 2.

Throttle cable 22 is connected (directly or indirectly) to loop member 40 to facilitate the raising of slide body 26 (thereby further opening the air passage through the fuel injector 14) in response to actuation by a user. The throttle cable 22 may be connected directly to slide body 26, or, as shown in FIGS. 6, 7 and 8, a throttle wheel 48 may be used to functionally couple throttle cable 22 (actuated by a user) to a second throttle cable 54, which is then physically coupled to the loop member 40 of slide body 26. Throttle wheel 48 is assembled to forks 56 of the second top member 57 of main housing 15. Throttle wheel 48 is configured to rotate around its center point, as illustrated by arrows 88. Both throttle cables 22, 54 are wrapped around throttle wheel 48. A throttle position sensor 52, preferably a potentiometer, is positioned inside of the main housing 15 so as to sense the position of the throttle cable 22. The throttle position sensor 52 provides an output signal to the control circuit 20, which uses this signal to adjust the amount of fuel and non-fuel fluid ejected from fluid ejector 30.

A purpose of the throttle wheel 48 described above is to adjust the amount of linear movement of the slide body 26 relative to the amount of linear movement of the throttle cable 22. A preferred throttle wheel 48 illustrated in FIG. 8 causes a smaller linear movement of slide body 26 relative to the actuating linear movement of throttle cable 22, thereby allowing a smaller overall fuel injector height. The throttle wheel 48 preferably has a smaller spool 49 and a larger spool 50 rigidly mounted on an axle 51. The throttle cable 22, which is connected to the throttle (not shown) passes through a small hole 53 (FIG. 7) in the main body 15 and is wrapped around the larger spool 50. The second throttle cable 54 is wrapped around the smaller spool 49. The second throttle cable 54 passes through the guide member 45 (FIG. 5) and is connected to the loop member 40 on the outer side of slide body top 35 (FIG. 4). The different diameters of the two spools 49, 50 allow the overall height of the fuel injector 14 to be reduced. When a throttle wheel 48 is used in the system, the throttle position sensor 52 is preferably connected to the throttle wheel axle 51, which measures the radial position of the throttle wheel 48 corresponding to the vertical position of the slide body 26 within the fuel injector 14 and communicates that information to the electronic control module 20.

FIGS. 9 and 10 illustrate additional details of an embodiment of the fluid ejector 30 of the slide body 26. As described in U.S. Pat. No. 6,162,589 (referenced above), an embodiment of the fluid ejector 30 generally includes one or more fluid feed channels 202. The embodiment illustrated in FIG. 9 shows two fluid feed channels 202(a) and 202(b), which facilitate the delivery of fuel and non-fuel fluids. Embodiments of the invention that deliver more than one fuel-type and more than one non-fuel fluid would have a corresponding number of fluid feed channels 202. As shown in the magnified view of FIG. 10, each fluid feed channel 202(a) and 202(b) includes a respective plurality of fluid feed slots 204 that are in fluid communication with their respective fluid feed channel 202. Each fluid feed slot 204 includes a firing chamber 205 and an energy dissipation element 206, such as a resistor or flextensional device, disposed therein. The fluid feed channels 202(a) and 202(b) receive fuel and non-fuel fluid through the respective cavities 31(a) and 31(b) and then into the respective fluid feed slots 204 and firing chambers 205 of the corresponding fluid feed channel. Fuel and non-fuel fluid in each firing chamber 205 is heated by the corresponding energy dissipation device 206, and, as a result, fuel and non-fuel fluid droplets are ejected through one or more corresponding nozzles (not shown) in the fluid ejector 30. The energy dissipation devices 206 are activated in response to control signals from the control circuit 20, which is preferably responsive to engine load and throttle position when embodied in an internal combustion engine.

The embodiment of FIG. 10 shows firing chambers 205 and energy dissipation devices 206 of two different sizes being connected to each fluid feed channel 202. Depending on the application, the firing chambers 205 and energy dissipation devices 206 may all be of the same size, or, as shown in FIG. 10, they may be of different sizes. The size of the firing chambers 205 and energy dissipation devices 206 determine the size of the fuel and non-fuel fluid droplets dispensed therefrom.

With reference to FIGS. 1–10, the operation of the system will be described in more detail. In operation, the flow path of air through the fuel injector 14 begins at the air filter 24. Air is drawn into the fuel injector either by an air pump or by the vacuum created by the motion of the piston(s) 107 in the combustion chamber(s) 17. Air flows through the air filter 24, into the main body 15, beneath the fluid ejector 30, out of the main body 15, and into the intake manifold 16. According to this exemplary description, the fuel injector 14 delivers fuel and non-fuel. Accordingly, the flow path of the fuel begins at the fuel reservoir 18(a) and non-fuel fluid reservoir 18(b). These materials flow through corresponding low pressure conduits (e.g. less than about 3 psi) from the fuel reservoir 18(a) and non-fuel fluid reservoir 18(b) to the main body 15, then through corresponding resiliently deformable conduits at a low pressure (e.g. again less than about 3 psi) to the inlets 41(a) and 41(b) on the slide body 26 (FIG. 4). The respective fuel and other fluid flow through the pressure regulators 32(a) and 32(b), through several slots in the standpipe (not shown) in the bottom of the housing 28 to the fluid ejector 30. The pressure regulators 32(a) and 32(b) maintain slight negative pressures (to create a backpressure) at the back of the fluid ejector 30 so that the fuel and the non-fuel fluid do not drool or run out of the fluid ejector 30 during non-use. The fuel and non-fuel fluid are drawn out of the respective pressure regulators 32(a) and 32(b) and into the fluid ejector 30 by the capillary action of the fuel and other fluid within the fluid ejector 30. The fuel and non-fuel fluid flow into their respective feed channels 202(a) and 202(b) and then into the respective plurality of fluid feed slots 204. Fixed quantum droplets of the fuel and non-fuel liquid are ejected from the fluid ejector 30. Control circuit 20 controls the volume ratio of the droplets ejected from the fluid ejector 30, and the volume ratio can be changed during operation of the engine.

Referring to FIG. 7, actuation of throttle cable 22, as indicated by the arrow 87, causes the throttle wheel 48 to rotate, as indicated by the arrow 88, and the slide body 26 to move up and down, as indicated by the arrow 89. The slide body 26 normally sits at the bottom of fuel injector housing 15, blocking the airway between the air filter 24 and the combustion chamber 17. The slide body 26 is biased toward this position by compression springs 46. When the throttle cable 22 is pulled away from the main body 15, the throttle cable 22 causes the throttle wheel 48 to rotate, which, in turn, causes the second throttle cable 54 to pull the slide body 26 upward and compress the compression springs 46. The second throttle cable 54 passes through the guide 45, and its motion is redirected from horizontal to vertical as illustrated in FIG. 7. The second throttle cable 54 is attached to the loop member 40 on the slide body top 35. When the slide body 26 moves upward, more of the airway between the air filter 24 and the combustion chamber 17 is uncovered and more air is permitted to flow into the fuel injector 14. The position sensor 52 detects the rotation of the throttle wheel 48 and sends a signal to the control circuit 20 indicating that more air is flowing into the fuel injector. The control circuit 20 adjusts the amount of fuel and non-fuel fluid ejected from the fluid ejector 30, and thus, the amount of fuel and non-fuel vapor provided to the combustion chamber 17 using any number control strategies used to regulate the ratio of air to the fuel and non-fuel fluid.

As shown in FIG. 10, the two different sized firing chambers 205 allow the respective fuel and non-fuel fluid to be ejected from the fluid ejector 30 in different-sized fuel droplets, i.e., different volumes. Depending upon the particular embodiment of the invention, the droplets of fuel could be ejected in a single fixed quantum or in any number of other fixed quantums simply by adjusting the number and sizes of the firing chambers 205. For example, for a given fuel, there can be one or more sizes of firing chambers 205. When the firing chambers 205 are of different sizes, the size of the fuel droplets ejected from the fluid ejector 30 can be controlled at any given time by selectively activating certain one of the firing chambers 205. For example, in the embodiment of the invention shown in FIG. 10 having two different sized firing chambers 205, relatively larger fuel droplets can be ejected from the fluid ejector 30 by selectively activating only the energy dissipation devices 206 in the relatively larger firing chambers 205. Similarly, relatively smaller fuel droplets can be ejected from the fluid ejector 30 by selectively activating only the energy dissipation devices 206 in the relatively smaller firing chambers 205. For example, during a cold-start of an internal combustion engine (starting the engine when it is at approximately ambient temperature), it has been found to be desirable to eject relatively smaller droplets of fuel from the fluid ejector 30. The relatively smaller fuel droplets tend to remain entrained in the airflow and not condense on the cold metal internal surfaces, thereby obviating the need to provide a higher volume of fuel to the combustion chamber during a cold start. Preferably, these relatively smaller fuel droplets are smaller than 30 microns in diameter. Therefore, during a cold start, the control circuit 20 causes only the relatively smaller firing chambers 205 to eject fuel droplets. After the cold start, and after the engine has heated up, the control circuit 20 may cause only the relatively larger firing chambers 205 to eject fuel droplets, since it has been determined that relatively larger fuel droplets tend to combust more efficiently during the normal operating temperature of the engine. This method of operating the described embodiment results in lower emissions because there is less unburned fuel expelled from the engine during cold start conditions, as compared to conventional methods. This method of operation can be implemented with either a single fuel type or multiple fuel types.

Regardless of the number of different sized firing chambers 205 used in the particular embodiment of the invention, the fuel and non-fuel fluid droplets are ejected from the fluid ejector 30 in discrete, fixed quantums in a drop-by-drop fashion vertically downward into a fast flow of air channeled beneath the slide body 26. When the droplets reach the air stream, their flight path changes from vertical to horizontal in this example. The airflow is designed such that mixing occurs between the air and the droplets, resulting in a combustible vapor. The combustible vapor is provided to the combustion chamber 17 through intake valve 101. Where, as shown in FIGS. 2, 3, 4, 6 and 9, the fuel injector 14 is configured to receive and dispense at least one fuel type and one type of non-fuel fluid, droplets of each are dispensed into the air stream below the fluid ejector 30, where the different droplets are mixed in the air stream before being delivered to the combustion chamber.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A fuel injector, comprising:
    a first input for receiving a fuel;
    a second input for receiving a non-fuel fluid; and
    a fluid ejector being configured to include a first drop ejector for discretely ejecting fixed quantum droplets of the fuel, the fluid ejector also being configured to include a second drop ejector for discretely ejecting fixed quantum droplets of the non-fuel fluid.

2. The fuel injector of claim 1, wherein the non-fuel is predominantly water.

3. The fuel injector of claim 1, the fluid ejector being further configured to eject the discrete droplets of the fuel and the discrete droplets of the non-fuel fluid substantially simultaneously.

4. The fuel injector of claim 1, wherein the fluid ejector further comprises first and second fluid feed channels, the first fluid feed channel being configured to receive the fuel, the second fluid feed channel being configured to receive the non-fuel fluid.

5. The fuel injector of claim 1, wherein the fluid ejector further comprises a first plurality of firing chambers and a second plurality of firing chambers, the first plurality of firing chambers being configured to receive the fuel and the second plurality of firing chambers being configured to receive the non-fuel fluid.

6. The fuel injector of claim 5, wherein the first plurality of firing chambers includes a first set of firing chambers wherein each firing chamber in the first set has a first volume, and wherein the first plurality of firing chambers further includes a second set of firing chambers wherein each firing chamber in the second set has a second volume.

7. The fuel injector of claim 1, further comprising a control circuit configured to selectively adjust a volume ratio of the fuel ejected from the first drop ejector relative to the non-fuel fluid ejected from the second drop ejector.

8. The fuel injector of claim 1, further comprising an air flow control valve configured to selectively allow air to pass through the ejected fuel and non-fuel fluid droplets so as to create a vaporized mixture from the fuel and non-fuel fluid.

9. A fuel injector, comprising:
    a fluid ejector configured to discretely eject fuel and non-fuel fluid in a digital manner; wherein
    the fluid ejector includes a first set of firing chambers and a second set of firing chambers, wherein each firing chamber of the first set has a first volume, and wherein each firing chamber of the second set has a second volume.

10. The fuel injector of claim 8, further comprising a control circuit configured to selectively activate the first set of firing chambers and the second set of firing chambers.

11. The fuel injector of claim 9, wherein the first volume is smaller than the second volume; and wherein the first set of firing chambers is activated under nominal operating conditions of an internal combustion engine and wherein the second set of firing chambers is activated under high load conditions of the engine.

12. The fuel injector of claim 11, wherein each firing chamber of the first set is configured to eject a fuel droplet having a diameter less than 30 microns.

13. A method of delivering fuel and non-fuel fluid to a combustion chamber of an internal combustion engine, comprising:
    ejecting discrete fixed quantum droplets of the fuel from a first drop ejector;
    ejecting discrete fixed quantum droplets of the non-fuel fluid from a second drop ejector; and
    vaporizing and mixing the discrete droplets of the fuel and the non-fuel fluid.

14. The method of claim 13, wherein the vaporizing step further comprises passing an air stream through the discrete droplets of the fuel and the non-fuel fluid.

15. The fuel injector of claim 13, wherein the non-fuel is predominantly water.

16. The method of claim 13, wherein the step of ejecting discrete droplets of a non-fuel fluid is performed when the engine operates under a high load condition.

17. A method for delivering fuel to a combustion chamber of an internal combustion engine, comprising:
    ejecting discrete fuel fixed quantum droplets from a first drop ejector;
    sensing that the internal combustion engine is operating under a high load condition;
    responsive to the sensing step, ejecting non-fuel fluid fixed quantum droplets from a second drop ejector; and
    vaporizing the ejected fuel droplets and the non-fuel fluid droplets.

18. A fuel consumption device, comprising:
    an internal combustion engine;
    a fuel delivery system coupled to the engine; wherein
    the fuel delivery system includes means for delivering discrete fixed quantum droplets of a fuel and means for delivering discrete fixed quantum droplets of a non-fuel fluid substantially simultaneously.

19. The fuel injector of claim 18, wherein the non-fuel is predominantly water.

20. The fuel injector of claim 18, wherein the fuel delivery system further includes a means for vaporizing and mixing the discrete droplets of the fuel and the discrete droplets of the non-fuel fluid.

21. A fuel injector, comprising:
    a first input for receiving a fuel;
    a second Input for receiving a non-fuel fluid; and
    a fluid ejector being configured to include a first drop ejector for ejecting a determined number of discrete droplets of the fuel, the fluid ejector also being configured to include a second drop ejector for ejecting a determined number of discrete droplets of the non-fuel fluid.

22. The fuel injector of claim 21, wherein the non-fuel is predominantly water.

23. The fuel injector of claim 21, the fluid ejector being further configured to eject the discrete droplets of the fuel and the discrete droplets of the non-fuel fluid substantially simultaneously.

24. The fuel injector of claim 21, wherein the fluid ejector further comprises first and second fluid feed channels, the first fluid feed channel being configured to receive the fuel, the second fluid feed channel being configured to receive the non-fuel fluid.

25. The fuel injector of claim 21, wherein the fluid ejector further comprises a first plurality of firing chambers and a second plurality of firing chambers, the first plurality of firing chambers being configured to receive the fuel and the second plurality of firing chambers being configured to receive the non-fuel fluid.

26. The fuel injector of claim 25, wherein the first plurality of firing chambers includes a first set of firing chambers wherein each firing chamber in the first set has a first volume, and wherein the first plurality of firing chambers further includes a second set of firing chambers wherein each firing chamber in the second set has a second volume.

27. The fuel injector of claim 21, further comprising a control circuit configured to selectively adjust a volume ratio of the fuel ejected from the first drop ejector relative to the non-fuel fluid ejected from the second drop ejector.

28. The fuel injector of claim 21, further comprising an air flow control valve configured to selectively allow air to pass through the elected fuel and non-fuel fluid droplets so as to create a vaporized mixture from the fuel and non-fuel fluid.

29. A method of delivering fuel and non-fuel fluid to a combustion chamber of an internal combustion engine, comprising:

ejecting a determined number of discrete droplets of the fuel from a first drop ejector;

ejecting a determined number of discrete droplets of the non-fuel fluid from a second drop ejector; and vaporizing and mixing the discrete droplets of the fuel and non-fuel fluid.

30. The method of claim 29, wherein the vaporizing step further comprises passing an air stream through the discrete droplets of the fuel and the non-fuel fluid.

31. The fuel injector of claim 29, wherein the non-fuel is predominantly water.

32. The method of claim 29, wherein the step of ejecting discrete droplets of a non-fuel fluid is performed when the engine operates under a high load condition.

33. A method for delivering fuel to a combustion chamber of an internal combustion engine, comprising:

ejecting a determined number of discrete fuel droplets from a first drop ejector;

sensing that the internal combustion engine is operating under a high load condition;

responsive to the sensing step, ejecting a determined number of discrete non-fuel fluid droplets from a second drop ejector; and vaporizing the ejected fuel droplets and the non-fuel fluid droplets.

34. A fuel consumption device, comprising:

an internal combustion engine;

a fuel delivery system coupled to the engine, wherein the fuel delivery system includes means for delivering a determined number of discrete droplets of a fuel and means of delivering a determined number of discrete droplets of a non-fuel fluid substantially simultaneously.

35. The fuel injector of claim 34, wherein the non-fuel is predominantly water.

36. The fuel injector of claim 34, wherein the fuel delivery system further includes a means for vaporizing and mixing the discrete droplets of the fuel and the discrete droplets of the non-fuel fluid.

* * * * *

UNITED STATES PATENT AND TRADEMARK OFFICE
CERTIFICATE OF CORRECTION

PATENT NO. : 6,945,198 B2
APPLICATION NO. : 10/915878
DATED : September 20, 2005
INVENTOR(S) : Abrams et al.

It is certified that error appears in the above-identified patent and that said Letters Patent is hereby corrected as shown below:

Col. 10 (line 37), delete "fuel fixed quantum" and insert therefor --fixed quantum fuel--.

Col. 10 (line 47), delete "engine;" and insert therefor --engine,--.

Col. 10 (line 61), delete "Input" and insert therefor --input--.

Signed and Sealed this

Twelfth Day of December, 2006

JON W. DUDAS
*Director of the United States Patent and Trademark Office*